United States Patent Office

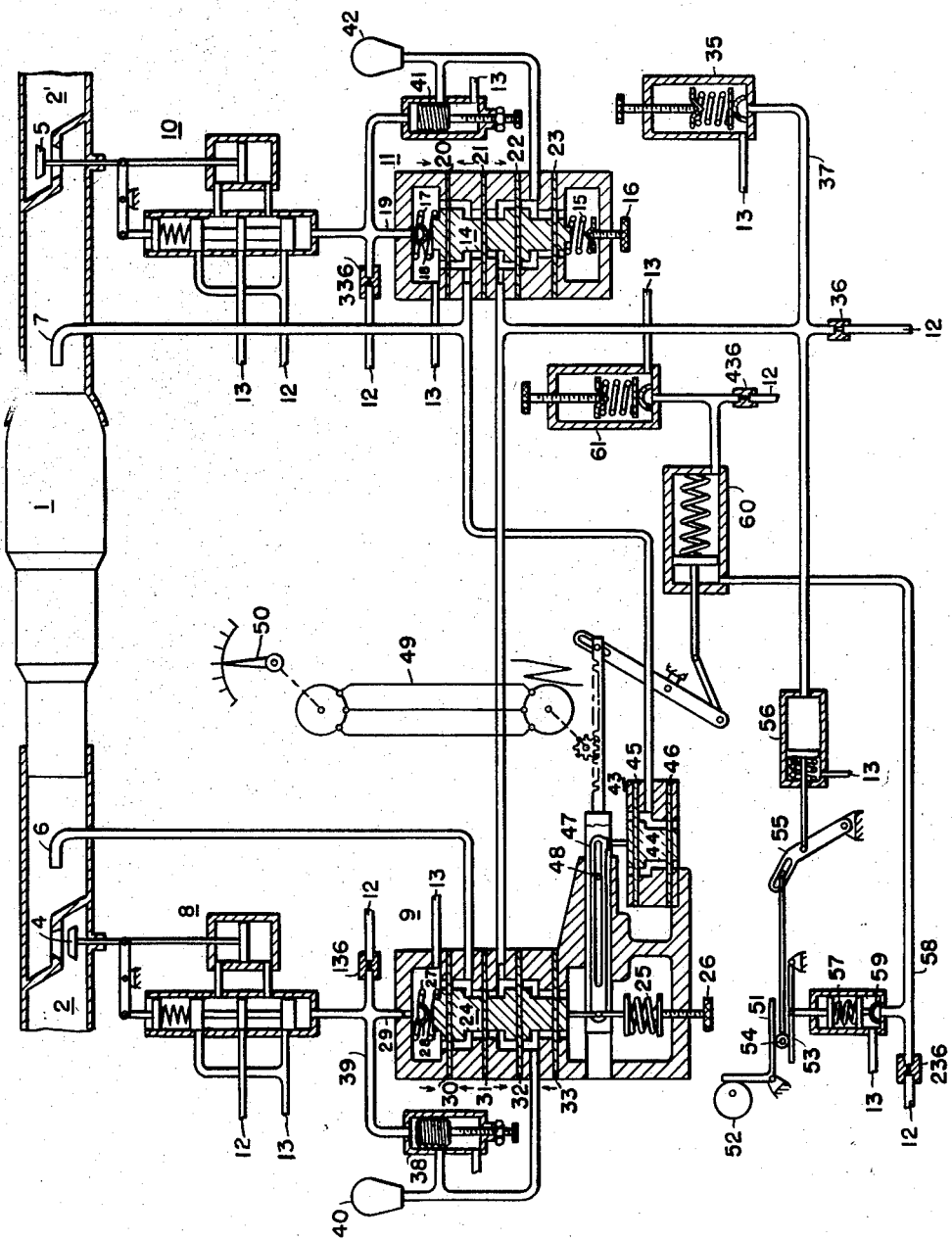

2,853,095
Patented Sept. 23, 1958

2,853,095

FLUID FLOW CONTROL APPARATUS

Anthony F. Schwendner, deceased, late of Ridley Park, Pa., by Doris M. Schwendner, administratrix, Ridley Park, Pa., assignor to Westinghouse Electric Corporation, East Pittsburgh, Pa., a corporation of Pennsylvania Application November 12, 1953, Serial No. 391,704

11 Claims. (Cl. 137—486)

This invention relates broadly to fluid flow control apparatus and more particularly to apparatus for controlling the inlet and exhaust pressure of a fluid flow chamber.

One object of this invention is to provide a control either separately or in combination of the inlet and exhaust pressures for a fluid flow chamber.

Another object of this invention is to provide a control for the ratio of the inlet to exhaust pressure of a fluid flow chamber.

Although the invention is broadly applicable to apparatus for controlling the inlet and exhaust pressure of a fluid flow chamber, it is illustrated here as applied to aviation gas turbine testing where it is necessary to duplicate atmospheric conditions prevailing at different altitudes. In order to duplicate the atmospheric conditions, the equipment must be able to supply the required air flow to the inlet under pressure depending on the altitude setting and the required pressure ratio between inlet and exhaust pressures. In addition to the required air flow, the equipment must be able to maintain a pressure ratio between the inlet and exhaust depending on the altitude setting and the speed of the aviation gas turbine or its equivalent fluid flow.

A more specific object of this invention is to provide a control for the ratio of the inlet to exhaust pressure of a fluid flow chamber and automatically change it in accordance with the altitude level and the flight speed or fuel input of the tested equipment.

The objects stated are merely illustrative. Still other objects and advantages will become apparent from a study of the following specification and the accompanying drawing, in which the single figure is a diagrammatic view of an embodiment of the invention.

With specific reference to the form of the invention illustrated, the numeral 1 indicates the gas turbine or fluid flow chamber which is to have controlled pressure conditions. A fluid flow passage 2 is connected to carry the inlet and another fluid flow passage 2' is connected to carry the exhaust for the fluid flow chamber 1. The pressure control valves 4 and 5 provide means for controlling the inlet and exhaust pressures, respectively. The fluid flow passages contain an inlet pressure sensing tube 6 and an exhaust pressure sensing tube 7. The inlet pressure valve 4 is controlled through a servo mechanism 8 which acts in response to a pressure responsive regulator 9. The pressure responsive regulator 9 is controlled by the pressure sensing tube 6. The exhaust pressure valve 5 is controlled through its servo mechanism 10 which responds to its pressure responsive regulator 11. The pressure responsive regulator 11 is controlled by the pressure sensed by the pressure sensing tube 7. The control pressure, regulated by the inlet pressure responsive regulator 9, will increase with an increase in the inlet fluid pressure and the operation is such that valve 4 will tend to close to thus decrease the inlet pressure of the fluid flowing to chamber 1. An increase in the exhaust pressure will increase the effect on the exhaust pressure responsive regulator 11 and the operation of regulator 11 is such as to open the exhaust air valve 5 to decrease the pressure at the exhaust end of chamber 1.

The servo mechanism 8 for the inlet pressure control valve 4 and the servo mechanism 10 for the exhaust pressure control valve 5 are powered from high pressure oil lines 12 and have drainage lines 13. The exhaust pressure responsive regulator 11 has three pressure chambers, a cup valve chamber and a stem 14. The stem 14 is spring biased upwardly by spring 15 which has an adjustable compression regulator 16. A spring member 17 is provided in the cup valve chamber which spring biases the stem 14 downward. The cup valve chamber has a cup valve 18, an oil inlet conduit 19 and an exhaust drain 13. A diaphragm 20 forms a wall between the cup valve chamber and the first pressure chamber, a diaphragm 21 forms a wall between the first pressure chamber and the second pressure chamber, a diaphragm 22 forms a wall between the second pressure chamber and the third pressure chamber, and a diaphragm 23 forms the opposite wall of the third pressure chamber. All of the diaphragms 20, 21, 22 and 23 are fixed to the common stem 14 so that the stem 14 will be responsive to the resultant of the forces on the diaphragms.

The inlet pressure responsive regulator 9 has a main stem 24 spring biased upwardly by a spring 25 with a compression adjusting screw member 26. A spring member 27 is provided in a cup valve chamber to bias the stem 24 downwardly. The cup valve chamber also contains the cup valve 28 and has an oil inlet tube 29 and an oil drain 13. A diaphragm 30 is provided between the cup valve chamber and the first pressure chamber, a diaphragm 31 is provided between the first pressure chamber and the second pressure chamber, a diaphragm 32 is provided between the second pressure chamber and the third pressure chamber and a diaphragm 33 forms the opposite wall of the third pressure chamber.

The pressure setting or the altitude level of the pressure responsive regulators 9 and 11 is controlled by the pressure adjuster or selector 35. The pressure adjuster 35 is simply a cup valve. The cup valve 35 selects the pressure level in the following manner: Oil is supplied from the high pressure oil line 12 through an orifice 36 to the second pressure chamber of the pressure responsive regulators 9 and 11. The pressure adjuster 35 has a lead-in line 37 from the high pressure oil line 12 on the low pressure side of orifice 36 to the second pressure chambers and an oil drain line 13. Thus by adjustment of the pressure adjuster 35, the pressure at which the oil is supplied to the second chamber of the pressure responsive regulators 9 and 11 is adjusted.

The pressure in the first pressure chamber of the pressure responsive regulator 9 is determined by the pressure sensed by the inlet pressure sensing tube 6, and the pressure in the first pressure chamber of the pressure responsive regulator 11 is determined by the pressure sensed by the exhaust pressure sensing tube 7. The pressure on the stem 24 due to the pressures in the three pressure chambers and the force of the two compression springs will produce a control pressure acting on the cup valve area to balance the combined forces on the stem. The cup valve is supplied with oil from the high pressure oil line 12 through an orifice 136 and inlet line 29. The pressure in the third chamber of the pressure responsive regulator 9 is applied through a proportioning and time delay device 38 from the line 39 which is at the same pressure as the cup valve 28. An air bell 40 is provided between the third chamber and the proportioning device 38. The effective stem actuating area of the two diaphragms 32 and 33 of the third pressure chamber is equal to the cup valve area of the cup valve 28 and exerts a pressure on the stem 24 in an opposite sense. Applying the pressure of cup valve 28 through the proportioning and time delay devices will enable the pressure responsive regulator to open or close the inlet pressure control valve 4 to accommodate changing air flows with very little change in air pressure.

When the force exerted on the stem 24 is varied, it varies the control pressure of the cup valve 28, and thus the oil pressure applied to change the position of the pistons of the servo mechanism 8 which in turn determines the position of the inlet pressure control valve 4.

The pressure responsive regulator 11 has a cup valve 18 supplied with oil from the high pressure oil line 12 through an orifice 336 and inlet line 19. The pressure of the cup valve 18 is applied through a proportioning device 41 to the third pressure chamber. An air bell 42 is also utilized between the proportioning device 41 and the third pressure chamber of the pressure responsive regulator 11. This arrangement is for the same purpose as is described for the cup valve 28 and the thid pressure chamber of the pressure responsive regulator 9. The proportioning devices 38 and 41 are preferably of the type disclosed in U. S. Patent 2,323,115, issued to O. N. Bryant on June 29, 1943, assigned to Westinghouse Electric Corporation, and given Serial No. 443,777.

The first pressure chamber of the pressure responsive regulator 11 receives the pressure sensed by the exhaust pressure sensing tube 7 and the second pressure chamber receives the pressure selected by the pressure adjuster 35, and the differential areas in the two chambers are such as to cause the resultant force on the stem 14 to be in opposite directions. Thus, any change in the exhaust pressure acting on the differential areas of the diaphragms will change the force acting on the stem 14 and thereby change the control pressure which acting on the servo mechanism 10 will cause the exhaust pressure control valve 5 to regulate the exhaust pressure and bring it back to the selected pressure.

The inlet pressure responsive regulator 9 is effected by yet another pressure chamber 43 which has a stem 44. The stem 44 is responsive to the resultant force on the diaphragms 45 and 46 which form two walls of the pressure chamber 43. The pressure chamber 43 is responsive to the pressure sensed by the exhaust pressure sensing tube 7. The stem 44 of the pressure chamber 43 acts upon a lever 47 which has one end connected to the stem 24 of the pressure responsive regulator 9 and has a pivot or fulcrum point 48. Thus, the stem 44 of the pressure chamber 43 applies a force to the stem 24 of the pressure responsive regulator 9 which is determined by the exhaust pressure and the position of the pivot point 48. With the fulcrum or pivot point 48 in its extreme right-hand position, the diaphragm 43 responding to the exhaust pressure is not able to add to the forces acting on the cup valve 28. Moving the fulcrum point 48 to the left, the force is increased and in its extreme position it is adjusted to obtain a pressure ratio between the inlet and exhaust pressures of 4 to 1. In the embodiment shown, an electrical synchro-unit 49 is driven by a rack and pinion so that the calibrated scale 50 will show the ratio of pressures.

For automatic operation of the aviation gas turbine testing apparatus shown, the ratio of inlet to exhaust pressure must change from 1 to 1.7 at sea level and from 1 to 4 at high altitudes depending upon the plane's speed. The altitude setting is combined to a function of speed. A control impulse from the air speed indicator or from the fuel lever is imparted to a bell crank lever 51 from the cam member 52. The bell crank transmits its motion to a lever 53 through an adjustable fulcrum point 54. The adjustable fulcrum point 54 is moved by a piston device 56 which is responsive to the control pressure from the pressure adjuster 35. The levers 51 and 53 are so aligned that at the minimum speed where the ratio remains 1 to 1 regardless of altitude (or pressure setting of the pressure adjuster 35), the movement of the fulcrum point 54 will not change the compression of the spring 57 below the lever 53. The load of the spring 57 determines the control pressure maintained in the line 58 by means of the cup valve 59. The oil line 58 is supplied from the high pressure oil line 12 through an orifice 236, and the oil line 58 supplies the control pressure regulated by the cup valve 59 to the piston mechanism 60 which positions the fulcrum point 48 to obtain the change in the ratio of inlet to exhaust pressure in line with control pressure. To correct any errors in the cam 52, the position of the speed or fuel corrector piston of the mechanism 60, the spring loaded cup valve in the position adjuster 61 can be used. The cup valve is supplied from the high pressure oil line through an orifice 436 and the control pressure of the cup valve which is applied on the spring side of the piston mechanism 60.

The pressure setting or altitude level of the pressure responsive regulators is thus controlled by the pressure adjuster 35, and the ratio of the inlet pressure to the exhaust pressure as determined by the cam member 52 which is responsive to the air speed or the fuel level. The piston mechanism 56 which moves the adjustable fulcrum point 54 through lever 55 and sets the inlet to exhaust pressure ratio on the inlet pressure responsive regulator 9, is considered the altitude corrector. At the minimum speed point, the altitude corrector control pressure (from the pressure adjuster 35) will hold the adjustable fulcrum point 54 at its extreme left-hand position. The inlet and exhaust pressure responsive regulators 9 and 11 only are affected and both are affected in exactly the same manner. The ratio of the inlet pressure to exhaust pressure remains at 1 to 1. When the speed or fuel control is moved and the cam 52 rotated, however, the compression of the spring 57 of the altitude corrector is changed and so the pressure on the piston in the servo mechanism 60 is changed, which changes the fulcrum point 48 and thus the ratio between the inlet and exhaust pressure. As the altitude setting is increased (by adjustment of pressure adjuster 35) the fulcrum point 54 of the altitude corrector is moved forward to the right, which will provide a higher control pressure change in the oil line 58 with the same fuel or speed stroke. In this way, the varying ratios of inlet to exhaust pressure at different altitudes are obtained.

It will be recognized that the objects of the invention have been achieved by providing a fluid flow control apparatus wherein the inlet and the exhaust pressure of the fluid flow may be controlled either independently or their ratios may be controlled.

While in accordance with the patent statutes one best known embodiment of the invention has been illustrated and described in detail, it is to be particularly understood that the invention is not limited thereto or thereby, but that equivalents and equivalent uses are within the inventive scope.

What is claimed is:

1. Fluid flow control apparatus comprising a flow passage having fluid inlet and exhaust sections, inlet fluid pressure control means at said inlet section, exhaust fluid pressure control means at said exhaust section, a first pressure responsive means responsive to said inlet pressure and said exhaust pressure and a selected pressure and having movable output means, a second pressure responsive means responsive to said exhaust pressure and said selected pressure and having movable output means, said inlet pressure control means being responsive to said movable output means of said first pressure responsive means to control said inlet pressure, and said exhaust pressure control means being responsive to said movable output means of said second pressure responsive means to control said exhaust pressure.

2. Fluid flow control apparatus comprising a flow passage having fluid inlet and exhaust sections, inlet fluid pressure control means at said inlet section, exhaust fluid pressure control means at said exhaust section, pressure adjusting means providing an adjustable output pressure, a first pressure responsive means responsive to said inlet pressure and said exhaust pressure and the pressure set by said pressure adjusting means and having movable output means, a second pressure responsive means responsive to said exhaust pressure and the pressure set by said pressure adjuting means and having movable output means, said inlet pressure control means being responsive to said movable output means of said first pressure responsive means to control said inlet pressure, and said exhaust pressure control means being responsive to said movable output means of said second pressure responsive means to control said exhaust pressure.

3. Fluid flow control apparatus comprising a flow passage having fluid inlet and exhaust sections, inlet fluid pressure control means at said inlet section, exhaust fluid pressure control means at said exhaust section, a first pressure responsive means responsive to said inlet pressure and exhaust pressure and a selected pressure and having movable output means, pressure ratio adjusting means operably connected with said first pressure responsive means for varying the effect of said exhaust pressure on said first pressure responsive means, a second pressure responsive means responsive to said exhaust pressure and said selected pressure and having movable output means, said inlet pressure control means being responsive to said movable output means of said first pressure responsive means to control said inlet pressure, and said exhaust pressure control means being responsive to said second pressure responsive means to control the exhaust pressure in accordance with the condition of said second pressure responsive means.

4. Fluid flow control apparatus comprising a flow passage having fluid inlet and exhaust sections, inlet fluid pressure control means at said inlet section, exhaust fluid pressure control means at said exhaust section, pressure adjusting means, a first pressure responsive means responsive to said inlet pressure, said exhaust pressure and the pressure set by said pressure adjusting means; pressure ratio adjusting means operably connected with said first pressure responsive means for varying the effect of said exhaust pressure on said first pressure responsive means, means responsive to the pressure set by said pressure adjuting means and connected to control said pressure ratio adjusting means, a second pressure responsive means responsive to said exhaust pressure and the pressure set by said pressure adjusting means and having movable output means, said inlet pressure control means being responsive to said movable output means of said first pressure responsive means to control said inlet pressure, and said exhaust pressure control means being responsive to said movable output means of said second pressure responsive means to control said exhaust pressure.

5. Fluid flow control apparatus comprising a flow passage having fluid inlet and exhaust sections, inlet fluid pressure control means at said inlet section, exhaust fluid pressure control means, pressure adjusting means providing an adjustable fluid pressure, first and second pressure responsive means, each of said pressure responsive mean having first, second and third pressure chambers with diaphragms forming two walls of each of said chambers and each pressure responsive means having respective pressure adjusting valve chambers, said respective pressure adjusting valve chambers each having a rigid wall, an exhaust port, and a valve; a stem for each pressure responsive means connected to be responsive to the resultant of the forces on the associated diaphragms and connected to the respective valves for regulating the pressure in said respective pressure adjusting valve chambers, said first pressure chamber of said first pressure responsive means being connected to receive pressure from said inlet section, and said pressure chamber of said second pressure responsive means being connected to receive pressure from said exhaust section, said second pressure chamber of said first and second pressure responsive means being connected to receive the pressure determined by said pressure adjusting means, said respective second pressure chambers producing forces on said respective stems of said pressure responsive devices which oppose the forces of said respective first pressure chambers, said respective third pressure chambers of said first and second pressure responsive means being connected to said respective valve chambers to receive a pressure proportional to the pressure of their respective valve chambers and producing forces on the respective stems in opposition to the forces due to pressure in said respective pressure adjusting valve chambers, said inlet pressure control means being responsive to the action of said stem of said first pressure responsive means to control said inlet pressure, and said exhaust pressure control means being responsive to the action of said stem of said second pressure responsive means to control said exhaust pressure.

6. Fluid flow control apparatus comprising a flow passage having fluid inlet and exhaust sections, inlet fluid pressure control means at said inlet section, exhaust fluid pressure control means at said exhaust section, pressure adjusting means providing an adjustable fluid pressure, first and second pressure responsive means, each of said pressure responsive means having first, second and third pressure chambers with diaphragms forming two walls of each of said chambers and each pressure responsive means having a pressure adjusting valve chamber, each pressure adjusting valve chamber having a rigid wall, an exhaust port, and a valve; a stem for each pressure responsive means connected to be responsive to the resultant of the forces on the associated diaphragms and the respective valves, said valves being actuated by the respective stems connected thereto and regulating the pressure in said respective pressure adjusting valve chambers, said first pressure chamber of said first pressure responsive means being connected to receive pressure from said inlet section, and said first pressure chamber of said second pressure responsive means being connected to receive pressure from said exhaust section, said second pressure chamber of said first and second pressure responsive means being connected to receive the pressure produced by said pressure adjusting means, said second pressure chambers each producing a force on the associated stem which opposes the force thereon of said first pressure chamber, said third pressure chamber of said first and second pressure responsive means being connected to the associated valve chamber to receive a pressure proportional to the pressure of said associated valve chamber and producing a force on said associated stem in opposition to the force due to pressure in the pressure adjusting valve chamber, a third pressure responsive device responsive to pressure at said exhaust section connected to effect the resultant force on said stem for said first pressure responsive means, said inlet pressure control means being responsive to the action of said stem of said first pressure responsive means to control said inlet pressure, and said exhaust pressure control means being responsive to said stem of said second pressure responsive means to control said exhaust pressure.

7. Fluid flow control apparatus comprising a flow passage having fluid inlet and exhaust sections, inlet fluid pressure control means at said inlet section, exhaust fluid pressure control means at said exhaust section, pressure adjusting means providing an adjustable fluid pressure, first and second pressure responsive means, each of said pressure responsive means having first, second and third pressure chambers with diaphragms forming two walls of each of said chambers and each pressure responsive means having respective pressure adjusting valve chambers, said pressure adjusting valve chambers each having a rigid wall, an exhaust port, and a valve, respective stems for each pressure responsive means connected to be responsive to the resultant of the forces on the associated diaphragms and the respective valves, said valves being respectively responsive to said respective stems and regulating the pressure in said respective pressure adjusting valve chambers, said first pressure chamber of said first pressure responsive means being connected to receive pressure from said inlet section, and said first pressure chamber of said second pressure responsive means being connected to receive pressure from said exhaust section, said second pressure chamber of said first and second pressure responsive means being connected to receive the pressure produced by said pressure adjusting means, said second pressure chambers producing forces on said respective stems which oppose the forces of said respective first pressure chambers, said third pressure chamber of said first and second pressure responsive means being connected to said respective valve chambers to receive pressure proportional to the pressure of their respective valve chambers and producing forces on the respective stems in opposition to the force due to pressure in the respective pressure adjusting valve chambers, a third pressure responsive device responsive to the pressure of said exhaust section, ratio adjusting means connecting said third pressure responsive means to the stem for said first pressure responsive means for determining the ratio of inlet to exhaust pressure by varying the effect of said third pressure responsive means on said stem for said first pressure responsive means, said inlet pressure control means being responsive to the action of said stem of said first pressure responsive means to control said inlet pressure, and said exhaust pressure control means being responsive to said stem of said second pressure responsive means to control said exhaust pressure.

8. Fluid flow control apparatus comprising a flow passage having fluid inlet and exhaust sections, inlet fluid pressure control means at said inlet section, exhaust fluid pressure control means at said exhaust section, a first pressure responsive means responsive to said inlet and exhaust pressures and a selected pressure and having movable output means, linkage means for varying the effect of said exhaust pressure on said first pressure responsive means, means connected to operate said linkage means in accordance with said selected pressure, a second pressure responsive means responsive to said exhaust pressure and said selected pressure and having movable output means, said inlet pressure control means being responsive to said movable output means of said first pressure responsive means to control said inlet pressure, and said exhaust pressure control means being responsive to said movable output means of said second pressure responsive means to control said exhaust pressure.

9. Fluid flow control apparatus comprising a flow passage having fluid inlet and exhaust sections, inlet fluid pressure control means at said inlet section, exhaust fluid pressure control means at said exhaust section, pressure adjusting means for producing a selected fluid pressure, a first pressure responsive means responsive to said inlet pressure, said exhaust pressure and the pressure produced by said pressure adjusting means and having movable output means; linkage means for varying the effect of said exhaust pressure on said first pressure responsive means, drive means responsive to the pressure of said pressure adjusting means and connected to drive said linkage means, a second pressure responsive means responsive to said exhaust pressure and the pressure produced by said pressure adjusting means and having movable output means, said inlet pressure control means being responsive to said movable output means of said first pressure responsive means to control said inlet pressure, and said exhaust pressure control means being responsive to said movable output means of said second pressure responsive means to control said exhaust pressure.

10. Fluid flow control apparatus comprising a flow passage having fluid inlet and exhaust sections, inlet fluid pressure control means at said inlet section, exhaust fluid pressure control means at said exhaust section, a first pressure responsive means responsive to said inlet and exhaust pressures and a selected pressure and having a movable output member, means for varying the effect of said exhaust pressure on said first pressure responsive means, a second pressure responsive means responsive to said exhaust pressure and said selected pressure and having a movable output member, said inlet pressure control means being responsive to said movable member of said first pressure responsive means to control said inlet pressure, and said exhaust pressure control means being responsive to said movable member of said second pressure responsive means to control said exhaust pressure.

11. Fluid flow control apparatus comprising a flow passage having fluid inlet and exhaust sections, inlet fluid pressure control means at said inlet section, exhaust fluid pressure control means at said exhaust section, pressure adjusting means producing a selected output pressure, a first pressure responsive means responsive to said inlet pressure, said exhaust pressure and the pressure set by said pressure adjusting means and having a movable output member; means for varying the effect of said exhaust pressure on said first pressure responsive means, a second pressure responsive means responsive to said exhaust pressure and the pressure set by said pressure adjusting means and having a movable output member, said inlet pressure control means being responsive to said movable output member of said first pressure responsive means to control the inlet pressure, and said exhaust pressure control means being responsive to said movable output member of said second pressure responsive means.

References Cited in the file of this patent

UNITED STATES PATENTS

| 1,196,121 | Larsen | Aug. 29, 1916 |
| 1,503,307 | Durr | July 29, 1924 |
| 2,270,304 | Jacobsson | Jan. 20, 1942 |
| 2,615,331 | Lundgren | Oct. 28, 1952 |